United States Patent
Ouyang

(10) Patent No.: US 11,205,218 B2
(45) Date of Patent: Dec. 21, 2021

(54) CLIENT USER INTERFACE ACTIVITY AFFINITY SCORING AND TRACKING

(71) Applicant: BBY SOLUTIONS, INC., Richfield, MN (US)

(72) Inventor: Dong Ouyang, Edina, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 461 days.

(21) Appl. No.: 16/011,407

(22) Filed: Jun. 18, 2018

(65) Prior Publication Data

US 2019/0385219 A1    Dec. 19, 2019

(51) Int. Cl.
*G06Q 30/06*    (2012.01)
*G06N 5/04*    (2006.01)

(52) U.S. Cl.
CPC ........ *G06Q 30/0641* (2013.01); *G06N 5/048* (2013.01); *G06Q 30/0631* (2013.01)

(58) Field of Classification Search
USPC ....................................................... 705/26.7
See application file for complete search history.

(56) References Cited

U.S. PATENT DOCUMENTS

| | | | | |
|---|---|---|---|---|
| 6,415,322 | B1* | 7/2002 | Jaye | G06Q 30/02 709/224 |
| 2003/0028451 | A1 | 2/2003 | Ananian | |
| 2005/0096997 | A1 | 5/2005 | Jain et al. | |
| 2008/0162268 | A1 | 7/2008 | Gilbert | |
| 2008/0201206 | A1 | 8/2008 | Pokorney et al. | |
| 2008/0270398 | A1* | 10/2008 | Landau | G06Q 30/02 |
| 2010/0250714 | A1 | 9/2010 | Wehmann et al. | |
| 2012/0036037 | A1 | 2/2012 | Xiao et al. | |
| 2013/0304607 | A1 | 11/2013 | Costa et al. | |

(Continued)

OTHER PUBLICATIONS

B. Chandramouli, J. Levandoski, A. Eldawy, M. Mokbel, StreamRec: A Real-Time Recommender System, 2011, Proceedings of the 2011 ACM SIGMOD International Conference on Management of data, pp. 1243-1246. (Year: 2011).*

(Continued)

*Primary Examiner* — Jason B Dunham
*Assistant Examiner* — Brittany E Bargeon
(74) *Attorney, Agent, or Firm* — Schwegman Lundberg & Woessner, P.A.

(57) ABSTRACT

Techniques and system configurations for generating, updating, and customizing user interface content and functionality based on user activity and a customer level of interest (affinity) for a particular commerce information item are disclosed. In an example, electronic operations used for generating and updating output of a user interface includes: processing streaming events that represent user activity involving a commerce information item performed by a user in a user interface; identifying a current score of the user activity from the streaming events; generating an affinity score corresponding to the commerce information item, based on forward time decay of a history score and a future score; and providing output in a user interface based on the generated affinity score. With these techniques, engagement and affinity of particular products/services, product groups, and offers, can be measured and tracked to enable improved outputs in an electronic commerce website or app.

23 Claims, 10 Drawing Sheets

(56) References Cited

U.S. PATENT DOCUMENTS

2014/0207580 A1     7/2014  Minnis et al.
2015/0348059 A1*   12/2015  Agara ................ G06Q 30/0601
                                                         705/7.29

OTHER PUBLICATIONS

Cormode, Graham, et al., "Forard Decay: A Practical Time Decay Model for Streaming Systems", *2009 IEEE 25th International Conference on Data Engineering*, (2009), 12 pgs.

Ouang, Dong, "Streaming Events Analysis for Search Recall Improvements", U.S. Appl. No. 15/827,507, filed Nov. 30, 2017, 51 pgs.

Ouyang, Dong, "Streaming Events Modeling for Information Ranking", U.S. Appl. No. 15/703,730, filed Sep. 13, 2017, 47 pgs.

\* cited by examiner

| Customer Activity Timeline (410) | Unique Product SKU Affinity Score for Customer (420) | |
|---|---|---|
| | Future Score (FS) | History Score (HS) |
| Day 0 – Baseline (Prior to Activity) | 0 | 0 |
| Day 1 – Viewed product, product category | Previous FS + ([weight of view event] * [time decay factor]^1) | Previous HS + ([weight of view event] * [time decay factor]^1) |
| Day 2 – Added product to cart | Previous FS + ([weight of cart event] * [time decay factor]^2) | Previous HS + ([weight of cart event] * [time decay factor]^2) |
| Day 3 – No Activity | No changes (same value as Day 2 FS) | No changes (same value as Day 2 HS) |
| Day 4 – No Activity | No changes (same value as Day 2 FS) | No changes (same value as Day 2 HS) |
| Day 5 – Purchase of Product | Reset to 0 (if users do not normally replenish/reorder item) | Previous HS + ([weight of purchase event] * [time decay factor]^5) |
| Day 6 – No Activity | No changes (same value as Day 5 FS) | No changes (same value as Day 5 HS) |
| Day 7 – Return to product category | Previous FS + ([weight of view event] * [time decay factor]^7) | Previous HS + ([weight of view event] * [time decay factor]^7) |

CLIENT USER INTERFACE ACTIVITY AFFINITY SCORING AND TRACKING

TECHNICAL FIELD

Embodiments discussed herein generally relate to data processing techniques performed on streaming interaction activities within electronic computing and communication systems. Certain embodiments discussed herein relate to processing client interaction event and activity data, and generating scores and outputs, for use in accessing information from information systems and information retrieval results provided by graphical user interface outputs.

BACKGROUND

A number of electronic systems are commonly used to coordinate the offer and sale of products or services, and the display of information for such products or services, in electronic commerce settings. Many types of electronic user interfaces are provided to consumers for accessing electronic commerce information via electronic platforms such as kiosks, smart devices, websites, or mobile apps. For instance, consumers commonly utilize user interfaces provided by e-commerce websites and apps to locate and browse products and services, obtain information (e.g., location, price, specifications) on products and services, and to make and manage electronic purchases of such products and services.

The shopping and information gathering activity performed in such user interfaces that leads to product and service purchases may involve searches, navigation, or other types of user activities, as part of inputs and outputs occurring within the user interface. Such activities and inputs may include user actions to select hyperlinked content, enter and refine search queries, navigate among different product or service descriptions and categorizations, designate or enter purchase information, or perform commerce actions such as to reserve, purchase, or schedule a selected product or service. These activities and inputs may include actions that are performed in a single user interface session, or in multiple user interface sessions. Accordingly, shopping and e-commerce actions that lead to a product purchase may occur across a timespan of minutes, hours, days, or even longer.

Existing commerce user interfaces and information systems often rely on complex rule sets and data prediction algorithms to offer suggestions or predictions of new content (such as to suggest products or services) that is likely to be relevant to a consumer. Such rule-based approaches are limited to the complexity of the rules and the available data points being monitored, and thus can result in inaccurate or incomplete results, or a significant amount of processing to provide useful recommendations in to a large catalog of information. Other approaches involved in generating suggestions or predictions for commerce user interfaces and information systems rely on customer segmentation, which categorizes a customer into one of a fixed number of categories, based on historical or expected behavior by other customers in a segment. This often leads to imprecise untargeted, incomplete, or irrelevant information being provided users. Further, both of these approaches are unable to quantify the customer's interest in a particular product or service, type or category of product or service, brands of products or services, or like groupings. This results in the use of additional computer and network resources for customers to locate or identify relevant information and to fulfill consumer purchasing activity.

BRIEF DESCRIPTION OF THE DRAWINGS

FIG. 4 is a chart that illustrates affinity scoring values in a time-based scenario, according to an example described herein.

FIG. 6 is a screenshot that illustrates user interface functionality in a category listing, in a user interface adapted to receive respective user activity events involved in affinity scoring, according to an example described herein.

DETAILED DESCRIPTION

Figure 1:
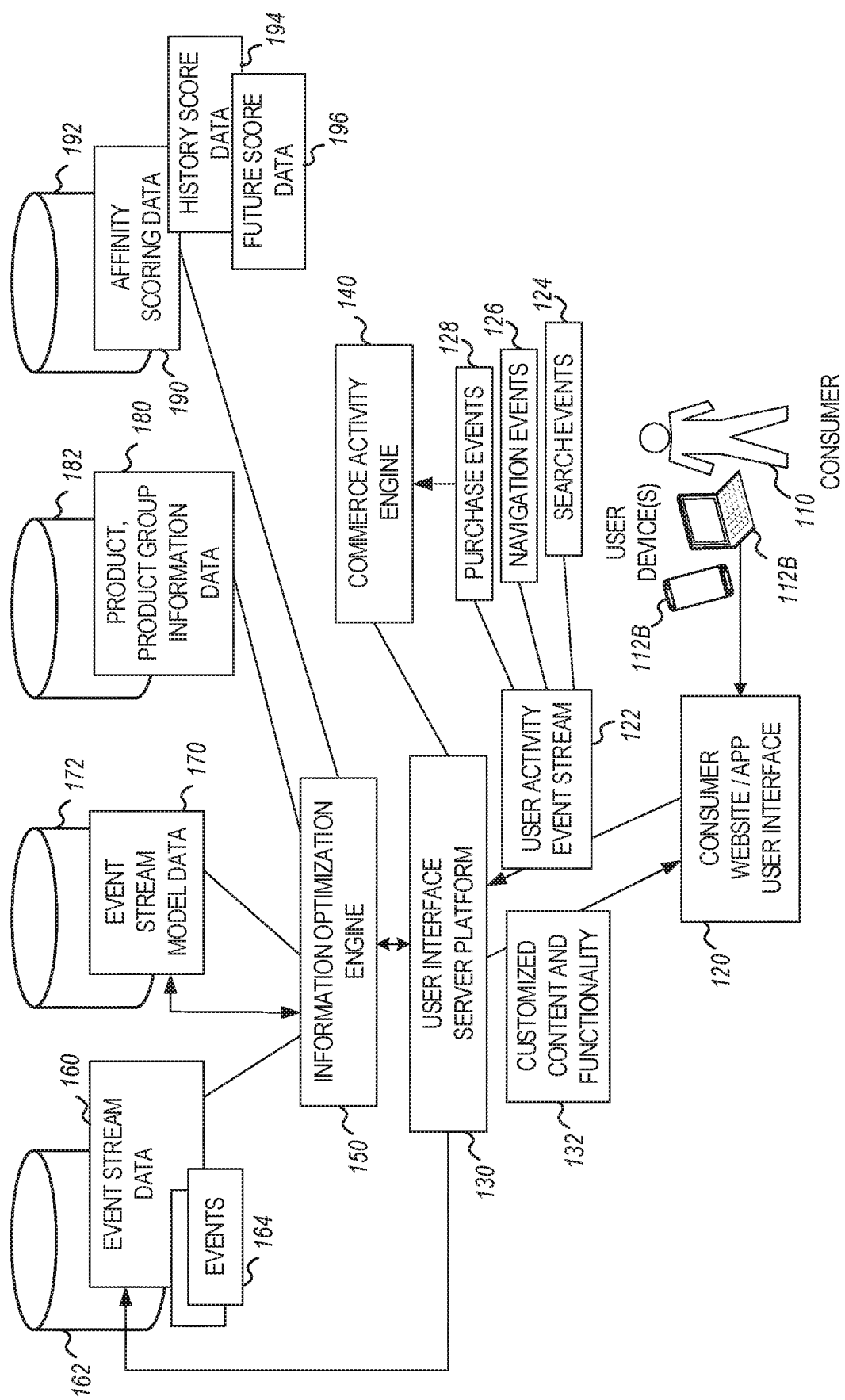
FIG. 1 is a diagram that illustrates an overview of systems involved in the generation and use of customized content and functionality using affinity scores within an electronic commerce system, according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples discussed herein are directed to techniques and configurations of computing systems that provide improved user interfaces and data processing techniques, involving scoring techniques used to predict customer affinity or other forms of interest or relevance measurements. As discussed herein, various types of streaming events received within a consumer-operated user interface platform, such as a website or software app, may be identified, filtered, and processed, to generate an affinity score for commerce activities and properties in real time. This affinity score may be composed from components such as a current activity value, a historical scoring value (e.g., a history score), and a predicted scoring value (e.g., a future score), which are produced from measurements of customer activities with individual products, groups of products, product categories, product brands, or services and groups of services associated with such products. The resulting score may be used in connection with user interface improvements and the display of enhanced, additional, or more relevant information to the customer. These user interface improvements may provide a tangible improvement to the accuracy of the information retrieval activity, while also improving the speed and functionality of the user interface platform and associated data processing and network communication transactions.

In an example, streaming events resulting from user interface browsing, selections, and actions are obtained from a commerce-based user interface, and this collection of streaming events is processed and evaluated in real-time to identify relevant scoring values in an affinity score. This affinity score may be constructed from a combination of a "history" and "future" score, with the "history" score designated to represent a current state of affinity based on current and historical data across users, and with the "future" score designated to represent a projected state of affinity based on current and historical data for a particular user. From these histories and future scores, many types of additions or changes to functionality and content may be provided within the commerce-based user interface. This may include the use of information filtering (e.g., to filter the type, number, presentation, or specifications of particular products, services, search results, or other content), targeted offers or recommendations (e.g., to provide content to a particular customer profile, or customer type, based on likelihood to purchase a particular item, type, category, brand, or other group or specification of a product or service), reminders (e.g., to provide time-based content, offers, or recommendations to encourage action for a particular item, type, category, brand, or other group or specification of a product or service), or the like.

As discussed herein, the "affinity" that is measured by the presently described score and metrics refers to a measurable level of interest, observed for or exhibited by a human user (e.g., a consumer), for a particular commerce information item exposed in a user interface. The affinity scores discussed herein may be tied to specific products, product groups, offers, or the like, such as with product group affinity score, product affinity score, and offer affinity score values discussed with reference to FIG. 3. Each of these affinity scores may be calculated in real-time with the use of a forward time decay applied to history and future scores, as stored history and future scores are updated with weighted values from current activity. This use of forward time decay enables a scaling and weighting of past values with minimal computation and data tracking.

A particular "commerce information item", as discussed herein, may take a variety of forms as part of output in the commerce user interface, including but not limited to: a product details listing (e.g., webpage or UI screen) for a particular product; a service details listing for a particular product; a category listing of one or more products or services for a particular category; or a search results listing of one or more products or services for a particular search query. As will be understood, the level of interest (affinity) in any particular product, product group, brand, or product property may lead to other actions and commerce information beyond these types of listings.

As explained below, the history score as employed with a particular user may be used to generate or select real-time customizations, offers, and recommendations for the user. The future score for a particular user may be used to generate or select reminders, personalized recommendations, and search results for the particular user. In contrast, existing techniques for generating recommendations and information targeting are primarily based on fixed user segmentation or rules, which results in arbitrary suggestions that are not customized to the current and real-time commerce activity being performed.

Various references are made in the following examples to affinity scoring in specific product commerce shopping activities, such as with the use of electronic shopping carts and purchase transactions, provided in current generation user interfaces such as websites and mobile device shopping apps. It will be understood that the scoring information ranking and processing techniques may also be applicable to other types of user interfaces and architectures. For instance, the following affinity scoring approaches may be implemented into other interfaces or information systems not directly involving a sale of a product or service; the following affinity scoring approaches may also be incorporated with systems that monitor and observe user interface activity in other fashions and do not directly involve the analysis of streaming events from electronic commerce websites or software apps.

As will be made apparent, the techniques discussed herein provide a mechanism for tracking, updating, monitoring, and responding to real-time user activity, to provide improved displays of information over time. In this fashion, the resulting recommendations, search results, criteria, rules, and models may be used to produce dynamic changes to engagement, exposure, and categorization of information and information types. These and other technical benefits that increase information retrieval accuracy and improve delivery of information and data processing tasks (and the use of network and processing resources) will be apparent from the following examples.

Figure 2:
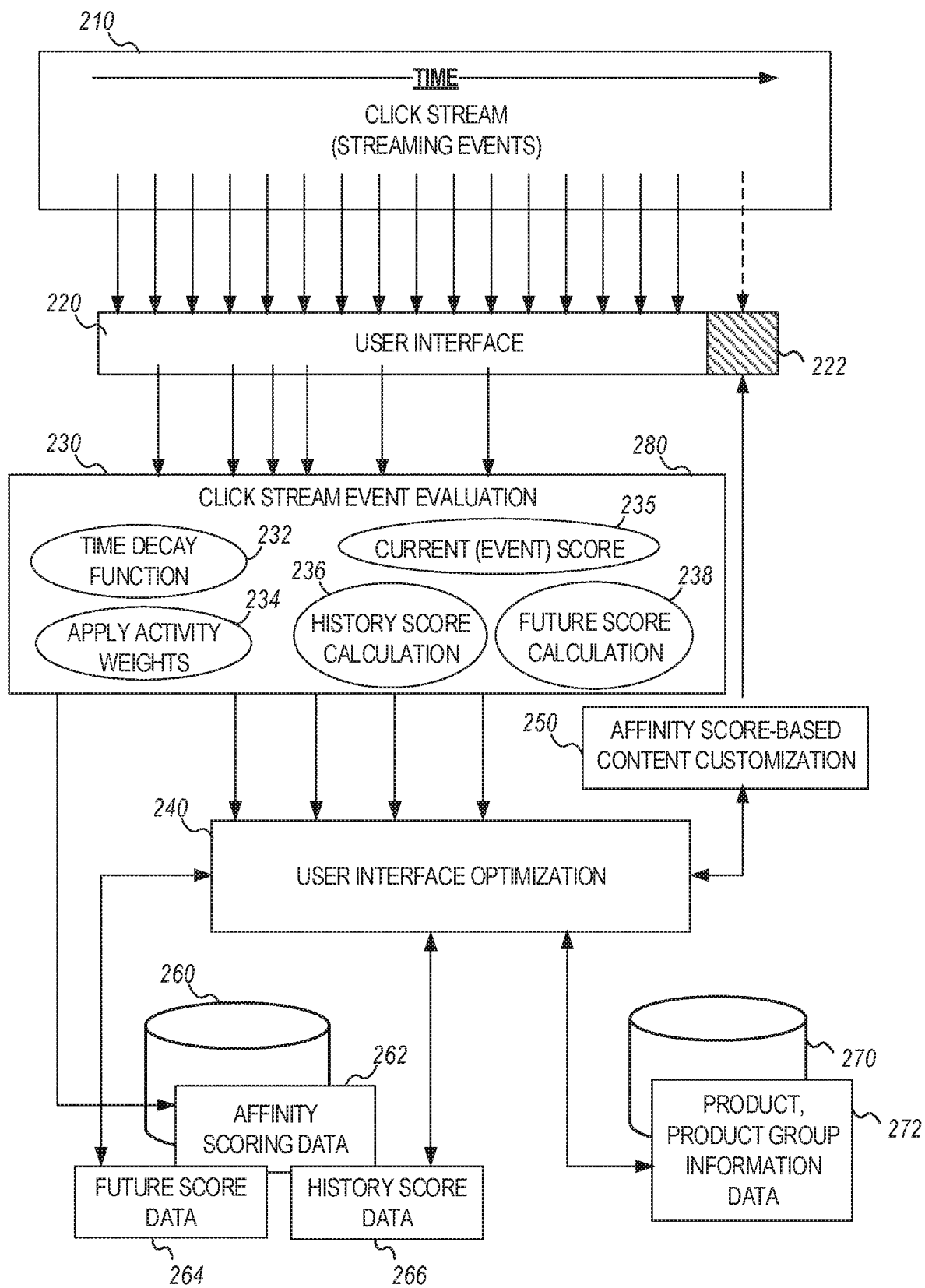
FIG. 2 is a diagram that illustrates a processing scenario for the customization of a user interface based on the evaluation of user interface events, according to an example described herein.
Figure 3:
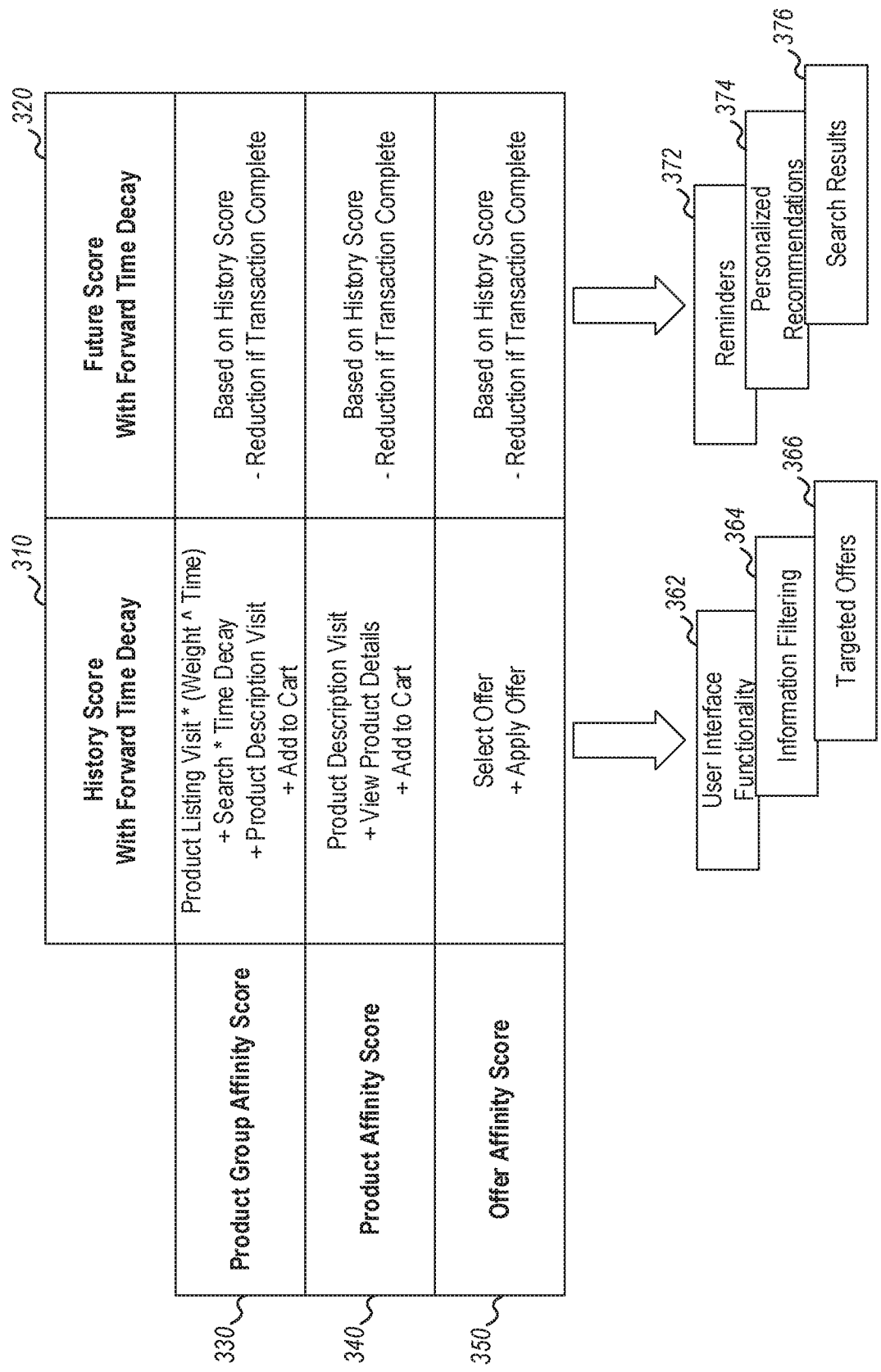
FIG. 3 is a diagram that illustrates affinity scoring types and actions performed based on affinity scoring, according to an example described herein.

FIG. 1 illustrates an overview of systems involved in the generation and use of customized content and functionality using affinity scores within an electronic commerce system, according to an example described herein. As shown, a consumer 110 operates a consumer computing device 112 (e.g., a personal computer (PC) 112A, or a mobile device 112B (smartphone, tablet, etc.) to access a consumer user interface 120. In an example, the consumer user interface 120 is a website or software application interface that is provided for shopping and purchasing of products and services. In the scenario of FIG. 1, the consumer 110 provides inputs to the user interface 120 to browse, navigate, and provide inputs while receiving and browsing information about products, services, and like aspects of electronic commerce offerings. Example arrangements of consumer-facing e-commerce websites for a product category is provided in FIG. 6 and a product item is provided in FIG. 7 and further discussed below, and example use scenarios of the website for observing such commerce activities are illustrated in the drawings of FIGS. 2 to 4.

The user interface 120 may be provided (e.g., distributed, hosted, or served) via a network on behalf of a business entity such as a retailer. The consumer 110 may use the user interface 120 to review, select, and purchase a particular product or service, within one or multiple sessions of the user interface 120, including over a period of minutes, hours, or days (or longer). The user interface 120 may present various forms of data, in the form of text, graphics, and video, relating to the advertisement, purchase, or specification of one or more products or services. The user interface 120 may obtain this data from various data systems and data sources, such as on request from a user interface server platform 130 that is maintained by the business entity or an associated service provider.

As shown in FIG. 1, the user interface 120 exchanges data with the user interface server platform 130, through various inputs and outputs exchanged between the user interface and the platform. For example, the server platform 130 may operate as a data service provided within a web server or cloud-hosted app interface (e.g., application programming interface (API)), which exchanges requests and responses between the user interface and the platform. In an example, the server platform 130 operates to serve (e.g., obtain, host, or transmit) customized content and functionality 132 to the user interface 120, based on an affinity scoring applied in an information optimization engine 150. Additional cloud and edge services, content aggregator or delivery networks, or like services that may be used as part of caching or optimizing content delivery are not depicted in FIG. 1 for simplicity.

In an example, the server platform 130 provides the customized content and functionality 132 in response to an ongoing activity event stream 122 that indicates various commerce user interaction activities occurring in the user interface 120. In an example, the activity event stream 122 may be based on a current session of the user interface 120 as operated by the consumer 110 on the consumer computing device 112. In a further example, the activity event stream 122 includes events from prior (e.g., previous, historical) sessions of the user interface 120 as operated by the consumer 110 over the period of minutes, hours, days, or longer. The activity events from the event stream 122 may be tracked, filtered, and stored as part of events 164 in an event stream data set 160 of a data source 162. These activity events from the event stream 122 or as part of the stored events 164 may be further identified, filtered, or analyzed based on event stream model data 170 stored in a data source 172 (e.g., as part of model data rules, properties, constraints, or the like that are applicable to affinity scoring).

Also in an example, the information optimization engine 150 is used to provide a customization, recommendation, or emphasis of the same or related products or services. For instance, this may include identifying targeted information for related products or products the consumer 110 is predicted as likely to buy, from a product and product group information data set 180 (e.g., stored in a data source 182) based on affinity scoring data 190 (e.g., stored in a data source 192). The affinity scoring data 190 may include history score data 194 and future score data 196, with an accompanying history score and a future score maintained for the particular consumer 110 in connection with one or more products, product groups, or other information. As discussed with reference to FIG. 2, the information may be identified by click stream event evaluation 230 and user interface optimization 240 processes, which may involve the application of time decays, weights, and modifications to update or re-calculate a history, current, or future score of affinity.

The use of affinity scoring may result in additional, supplemented, suggested, prioritized, reordered, categorized, or characterized content to be output (or removed from the output) of the user interface, including in real-time when the particular user activity is identified. Specifically, the affinity scoring data 190 can be used to generate an affinity score in real time, based on the history score data 194 and the future score data 196, that indicates a level of interest for a particular commerce information item (e.g., product, brand, category, etc.). As discussed with relation to FIG. 2, this level of interest can be calculated with a forward time decay to emphasize the current activity relevance while considering the historical activity and score values, without needing to re-calculate and re-weight all prior historical activity and score values.

The activity event stream 122 that is provided from the user interface 120 may involve a variety of events initiated by the consumer 110, the consumer computing device 112, or other entities, such as search events 124 (e.g., from a user initiating a search to locate product or service information, based on one or more keywords or phrases); navigation events 126 (e.g., a user navigating between different pages or screens, such as by clicking on product or product group links, selecting another screen, etc.); and purchase events 128 (e.g., a user performing an affirmative shopping activity such as adding a product to a shopping cart or shopping list, confirming payment information to purchase an item, scheduling a service or delivery, or like activities). Some of these events, such as the purchase events 128, may result in the generation of additional commerce events (e.g., product reservations, scheduling, purchases, reordering, shipping) performed or facilitated with a commerce activity engine 140. Other forms and types of events may occur as part of the activity event stream 122. These respective events may correspond to different scoring values implemented with the calculated affinity score.

In an example, multiple types of the events 124, 126, 128 may occur within a single or multiple user interface sessions. For instance, multiple purchase events 128 involving a product, accessories, and services are likely to occur in connection with a user interface workflow involving a purchase of a particular product (e.g., a home appliance such as a washing machine). This workflow may involve a user first searching for a product (e.g., searching for the keywords "washing machine" in a search term box), receiving a user interface presenting listings of multiple matching product entries, receiving a user selection of one or more of those product entries, receiving a selection of one or more of those product entries to a shopping cart, and continuing on to the entry of purchase information, confirmation of shipping and payment information, etc. The progression of events in a user interface session may cause an increased history score over time as indicated by the history score data 194 (as the user's historical activity suggests an increase in interest in a particular product or type of product, for example) and an increased future score indicated by the future score data 196 (as the user's projected activity increasingly suggests product fulfillment with a future purchase, for example). However, once the purchase is made, the future score may drop off significantly, because it is unlikely the consumer will purchase the same item again.

In further examples, the information optimization engine 150 may provide other types of customized content including search results as a result of other aspects of streaming event processing. Such streaming event processing may provide various approaches for balancing of ranking searches and information content, or selecting particular types of information content, including in combination with an affinity score. Examples of ranking and ordering based on a stream model, within a configuration similar to that depicted in FIG. 1, is further described in another patent application filed by the present inventor, Ser. No. 15/703, 730, titled "STREAMING EVENTS MODELING FOR INFORMATION RANKING", and filed on Sep. 13, 2017, which is incorporated by reference herein in its entirety; other examples of streaming event analysis for search recall improvements, within a configuration similar to that depicted in FIG. 1, is further described in another patent application filed by the present inventor, Ser. No. 15/827,507, titled "STREAMING EVENTS ANALYSIS FOR SEARCH RECALL IMPROVEMENTS", and filed on Nov. 30, 2017, which is incorporated by reference herein in its entirety.

FIG. 2 is a diagram that illustrates an example processing scenario for the customization of a commerce user interface 220 based on the evaluation of user interface events. As shown, the user interface optimization 240 is implemented as a result of a click stream event evaluation process 230 that applies various weights, decays, and score updates. As discussed herein, the user interface optimization 240 may result in the changes to the content or layout of the commerce user interface 220 to provide additional functionality, information filtering or changes, suggested or recommendation information, additional or changed search results, relating to products or services or other commerce characteristics.

In an example, the various types of streaming events 210 are received from a click stream of events 210, which are produced as the user interacts with the commerce user interface 220 and goes from screen to screen, and selects, navigates, or performs input actions with the user interface. This click stream of events 210 may provide events from a plurality of users among a plurality of sessions, over a large time period (e.g., days, weeks, months).

The streaming events may be filtered or identified, such that a smaller number of events are processed with the evaluation process 230. In an example, streaming events captured from the user interface 220 may include: actions to retrieve or view a particular product, product type, product brand, or product characteristics; navigation or selection of a product or service; selection or comparison navigation to view additional information, product specifications, reviews, features, or the like; selection or other commands to add a product to cart, or to reserve or schedule a service; and selection or other commands to finance, reserve, or perform a purchase activity.

In an example, the evaluation process 230 produces a current score 235 for each particular event, which may be valued differently depending on the relevance or significance of the event. For example, a higher value may be assigned to a commerce event such as add to cart, whereas a lesser value may be assigned to performing a search for a product or clicking on a product description link. Also in an example, various types of activity weights 234 may be applied to emphasize or de-emphasize the relevance of particular types of events or conditions of the events. Instead of re-evaluating and re-applying weights to each event, an affinity score provides a cumulative ongoing score that can be updated as new events are generated.

The evaluation process 230 may be used to produce or update an affinity score from one or a combination of metrics, such as a combination of a history score calculation 236 and a future score calculation 238 produced from the click stream events. As described below with reference to FIG. 3, the history score may be calculated from a combination of the score 235 assigned to the current activity (e.g., a score given to a product category listing visit, or product description visit, such as to provide "1" point) with a stored history score (e.g., a stored history score 266 which provides a "0.8" point value). In the same fashion, a future score may be calculated from a combination of the score 235 assigned to the current activity (e.g., a score given to a product category listing visit, or product description visit, such as to provide "1" point) with a stored future score (e.g., a stored future score 264 which provides a "0.8" point value). In an example, initial commerce events such as searches or navigation may receive a lower score; whereas more complex or sequential commerce acts, such as the selection of a particular product into an electronic shopping cart, or viewing of multiple products in a common category, result in a higher score.

A forward time decay may be applied by the time decay function 232 to increase the importance of the current score 235 and de-emphasize the value of a previously stored history score or future score. The history score calculation 236 and the future score calculation 238 may result in the generation or updating of an affinity scoring value 262 that is stored and tracked (e.g., in a database or other data store) over time. This affinity scoring value 262 may be tied to a specific customer, product, product group, or other segments or attributes.

Based on the affinity score, the user interface optimization process 240 may apply affinity score-based content customization 250, including the retrieval of different or additional product and product group information 272 (e.g., stored in a database 270 or other data store for use with the user interface 220). This content customization 250 may result in the addition, change, or removal of content 222 (e.g., text, graphics) in a user interface. As a simple example, the change to the content 222 may include the recommendation of a suggested product from a particular category and brand of products, based on the affinity score calculated for that product category and brand. The change to the content 222 may also emphasize or de-emphasize search results or offers for certain products, or override user segmentation or profile information, FIG. 3 is a diagram that illustrates example affinity scoring types and actions performed based on affinity scoring. As shown, three types of affinity scores, product group affinity score 330, product affinity score 340, and offer affinity score 350, each include respective aspects of a history score 310 and a future score 320. Other examples of an affinity score may refer to either or a combination of the scores 310, 320, or some derivation thereof.

As shown, the history score values 310 may be computed for a particular affinity score type 330, 340, 350 based on the particular interaction, such as interaction with a category, a product, or an offer. As an example, the history score 310 computed for a product group affinity score 330 may be based on a product listing page visit, in addition to other actions (searches, product description visits, adding a product to an electronic shopping cart) related to the group of products (e.g., a product group based on brand, type or category of product, common attributes, etc.). For instance, the product group affinity score 330 may be used to predict users' affinity for product categories like "laptop", or other groups of products like "ACME brand", "Luxury product", and the like.

Also as an example, the history score 310 computed for a product affinity score 340 may be based on a product description visit, viewing the product details of a product, and adding the product to an electronic shopping cart. The product affinity score 340 may be associated with a particular SKU, product model, or product identifier. Also as an example, the history score 310 computed for an offer affinity score 350 may be based on the selection and application of an offer (e.g., to a product cart).

The future score values 320 may be computed for a particular affinity score type 330, 340, 350 based on the history score (which as discussed above, is based on a particular interaction), with a reduction when the transaction is complete. Although not shown, other information related to the user, user profile, user groups, or predicted actions may also be considered in the future score values 320.

The history score 310, which is tied to a prediction of a level of interest, may be used to produce features including: user interface functionality 362, information filtering 364, or targeted offers 366. The future score 320, which is tied to a prediction of performing a commerce transaction, may be used to produce features including: reminders 372, personalized recommendations 372, or search results 376. Other user interface actions, and actions occurring outside of the user interface, may also be provided.

In an example, the history score 310 may be used to calculate scores across users. For instance, consider a scenario where 10 users have high score on 20 products. If another user has a high score on 19 out of the 20 products, the history score 310 can be used to predict that the another user will also have a high score for the other one (out of 20) products liked by the 10 users in contrast, in an example, the future score 320 may be used to calculate scores for a single user, based on that particular user's activity.

FIG. 4 is a chart that illustrates the calculation of affinity scoring values in an example time-based scenario. This chart includes a series of affinity values 420 produced at different points in a customer activity timeline 410. These affinity values 420 specifically represent the affinity score for a customer, as indicated with a future score and history score for a particular product (as identified by a stock keeping unit (SKU)).

As shown, a baseline affinity score may be associated with the product. SKU at Day 0; in some examples, this baseline affinity score may be defined based on conditions or rules. The customer activity timeline 410 progresses as shown, with the following calculations:

Day 0—Prior to user activity: scores established at a base line (e.g., future score=0, history score=0).

Day 1—User Activity: Viewed product; Future Score is calculated from: previous Future Score (0)+([weight of viewing a product]*[time decay factor]^1); History Score is calculated from: previous History Score (0)+([weight of viewing a product]*[time decay factor]^1).

Day 2—User Activity: Added product to cart; Future Score is calculated from: previous Future Score+([weight of add to cart event]*[time decay factor]^2); History Score is calculated from: previous History Score+([weight of add to cart event]*[time decay factor]^2).

Day 3: No user activities. No changes to Future Score and History Score.

Day 4: No user activities. No changes to Future Score and History Score.

Day 5: User Activity: Purchase of the product; Future Score is set to 0 if users do not normally replenish or re-purchase this product; History Score is set to previous History Score+([weight of purchase event]*[time decay factor]^5).

Day 6: No user activities. No changes to Future Score and History Score.

Day 7: User Activity: return visit to product category; Future Score is calculated from: previous Future Score (0)+([weight of viewing a product]*[time decay factor]^7); History Score is calculated from: previous History Score+ [weight of viewing a product]*([time decay factor]^7).

in the previous calculations, "^" means "to the power of", "*" means "multiplied by", and the "time decay factor" controls the relative importance of time. For instance, to cause today's event to be 5% more important than yesterday's event, then 1.05/day can be used as the time decay factor. A value such as 1.05^1 may be supplied, when using a day as the unit and 1 day has passed between day 1 and a baseline date.

The affinity values 420 thus demonstrate the application of a forward decay. Forward decay works by reduce the importance of past events the same, by weighing new events with an increased score. In contrast, uses of classic decay will apply different decay weight for each event based on how far that event is from the current time. However, when dealing with dealing with massive amounts of events, such billions of click events in a commerce user interface, the scale of the problem to apply classic decay becomes computationally infeasible. Accordingly, the use of forward decay can provide a useful mechanism to quickly tie the user activity to a current approximation of affinity, while considering but not over-emphasizing past activities.

Figure 5:
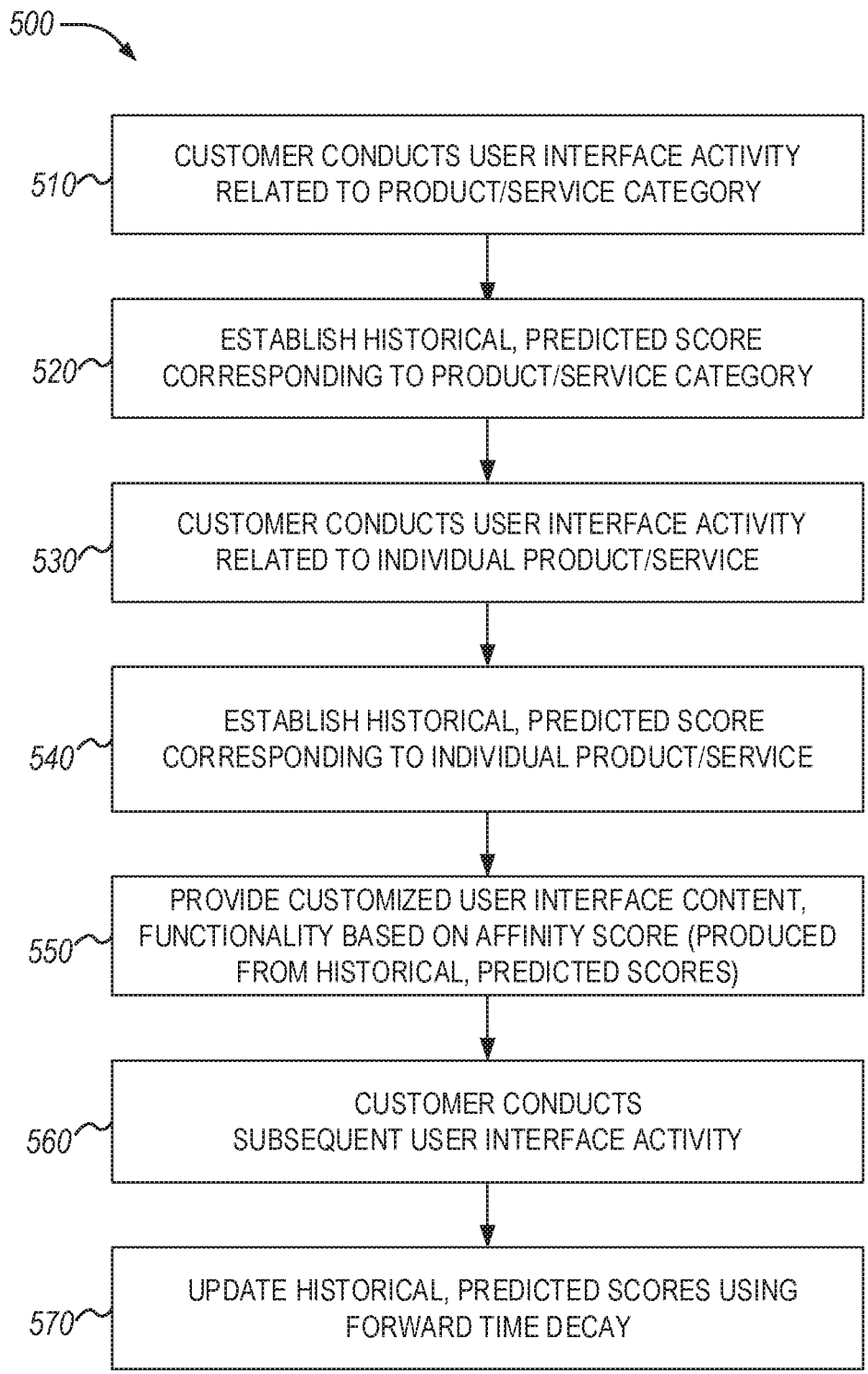
FIG. 5 is a flowchart that illustrates a technique for generating and updating affinity scoring values, according to an example described herein.

FIG. 5 illustrates a flowchart 500 of an example technique for capturing and processing searching activity for use within an affinity scoring scenario. The flowchart 500 is depicted from the perspective of a data processing system, such as a data processing system including a web server or software interface that receives and coordinates a sequence of product group (category) and product interactions, as measured with a streaming event data store and a user interface processing system. However, it will be understood that the following techniques may be applicable among multiple types of systems, and within other types of user interaction settings.

The flowchart 500 depicts a scenario for calculating and employing an affinity score based on stream events, such as in the stream events processing scenario described with reference to FIG. 2. As shown, the operations of the flowchart 500 commence with a customer performing various user interface activities related to a product or service category (operation 510). For instance, this may occur as a result of a user searching for a product category keyword (e.g., "refrigerators"), or selecting a category from a list of categories. Based on the user interface activities, historical and predicted scores corresponding to the product and service category are established (operation 520).

As shown, the operations of the flowchart 500 continue with the customer performing various user interface activities related to an individual product or service, which is part of the same product category (operation 530). For instance, this may occur as a result of a user selecting, saving, or searching for a particular product. Based on the user interface activities, historical and predicted scores corresponding to the product or service are established (operation 540).

Within one or multiple user interaction sessions, customized user interface content and functionality is outputted based on an affinity score (operation 550). The affinity score is produced from the historical and predicted scores, such as with use of weights and forward time decay, as discussed above. In further examples, as the customer conducts subsequent user interface activity (operation 560), the historical and predicted scores are updated using a forward time decay (operation 570). Additional operations to provide additional customized user interface content (e.g., as in operation 550) may be repeated.

Figure 6:
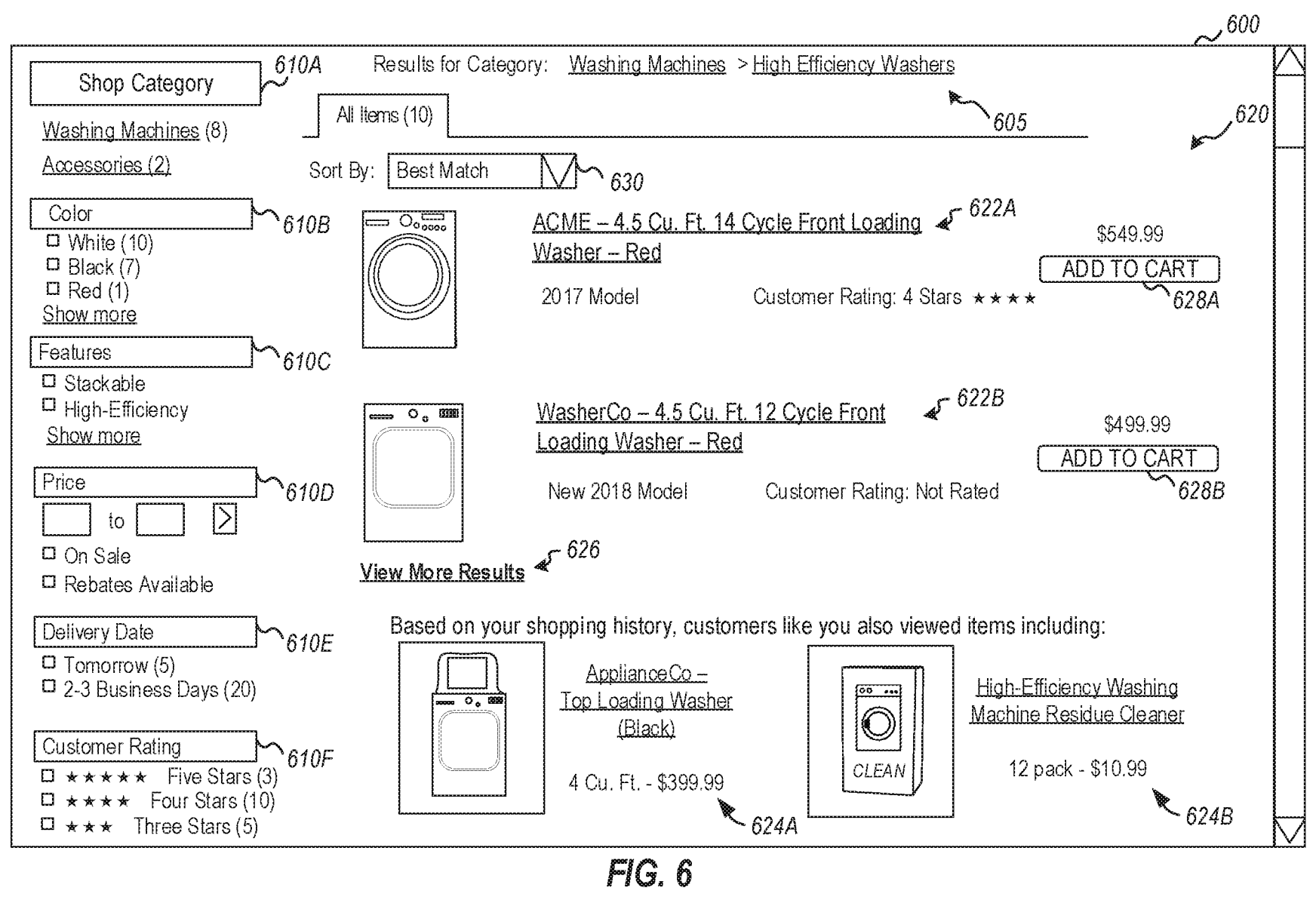

FIG. 6 is a screenshot illustrating user interface functionality in a category listing, in a user interface adapted to receive respective user activity events involved in affinity scoring. Specifically, the user interface layout 600 is adapted to present and receive information and selection options for products or services in a webpage-based user interface, and receive commerce events as a result of sequential commerce interaction activities. As shown in FIG. 6, the user interface layout 600 provides an interface with a number of information selection and display options, specifically depicting results 620 for a particular product type (as shown, a category of appliance). It will be understood that the example of the user interface layout 600 is not limited to the presentation of appliance products, as other types of products, product features, and accompanying services may also be presented or advertised.

The user interface layout 600 specifically depicts the listing of category results 620 in addition to selection options (610A-610F) to refine, limit, or invoke a subset of results. For instance, a consumer may choose to select one or more of the user interface checkboxes to expand or limit the category results 620. Visibility of additional results may be provided through an affirmative selection of additional results (e.g., a "View More Results link 626), through scrolling or swiping, or through other forms of user interaction.

The information that is presented in the category results 620 may include basic or detailed information, including text and graphical information in a variety of forms. As shown, information presented for a first product may include a corresponding product link 622A, product summary information, pricing information, customer ratings, and the like; the information presented for a second product may include a corresponding second product link 622B, and like product details. Each of the results may include a purchase selection option, such as respective "Add to Cart" buttons 628A, 628B for the respective products. In further examples, a user may conduct subsequent commerce activity as a result of navigating to the product display page (e.g., as discussed with reference to FIG. 7, below), and the product display page may include other options to directly purchase, add to cart, reserve, add to a shopping list, etc.

As discussed with the techniques above, the activity conducted within the user interaction events in a user interface (such as the user interface layout 600) may produce streaming events relevant to affinity score processing. For instance, the entry of various types of commerce inputs with the category results 620 (e.g., clicking on a product link 622, selecting or interacting with the information, or invoking a purchase option such as "Add to Cart" 628) generates events that may contribute to an affinity score of a particular product, category, brand, or the like.

The user interface layout 600 further includes suggested information which may be populated, selected, refined, or updated as a result of the affinity score. This is shown with an accompanying listing of a suggested product 624A, determined from a combination of a history score or future score indicating interest in the particular product or product type (as an example, an affinity score associated with the consumer indicating an affinity of the "ApplianceCo" brand from a history score). This is also shown with an accompanying listing of a suggested product 624B, determined from a combination of a history score or future score indicating interest in the particular product or product type (as an example, an affinity score associated with the consumer indicating an affinity of a Washing Machine accessory from a future score).

Figure 7:
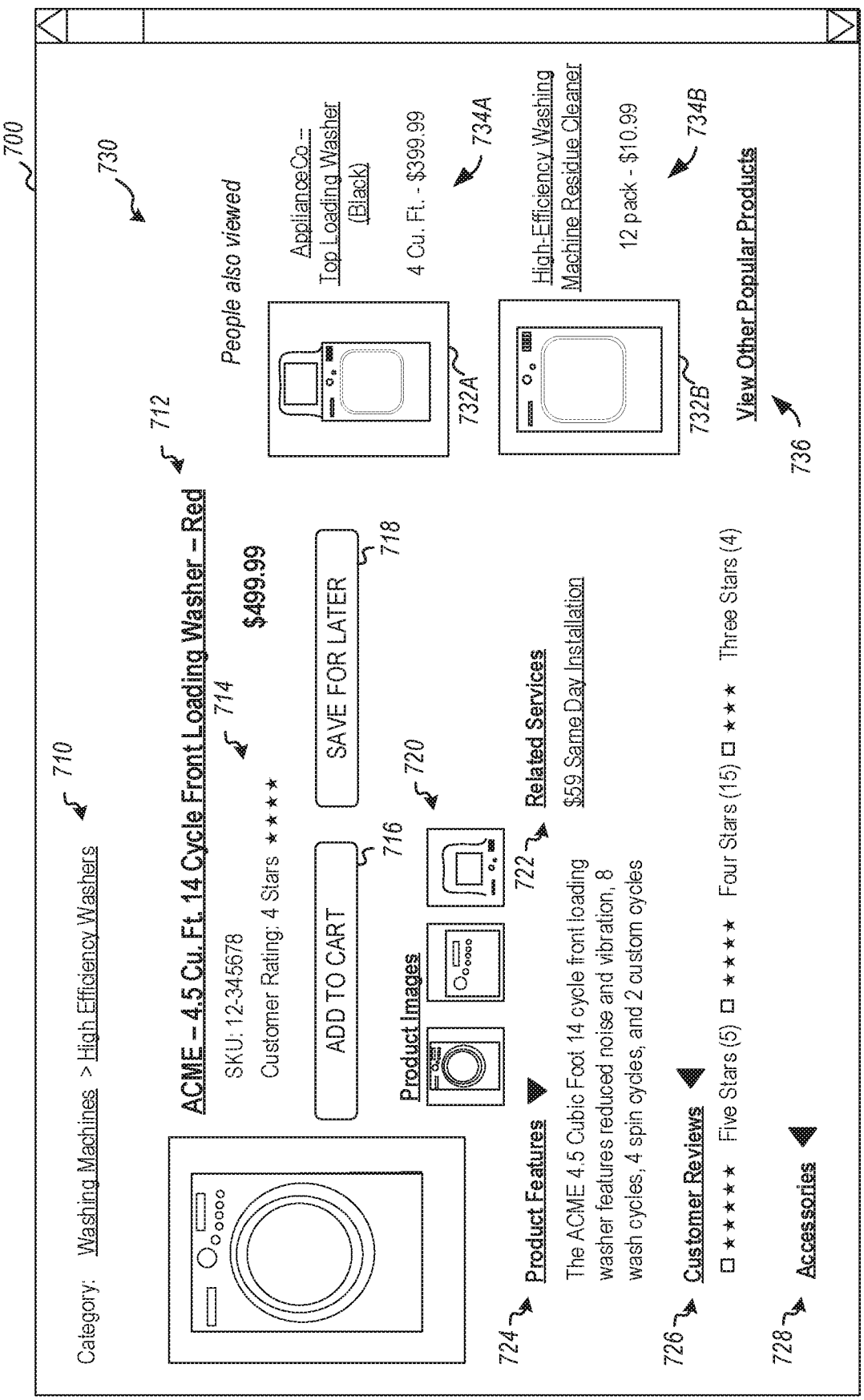
FIG. 7 is a screenshot that illustrates user interface functionality in a product listing, in a user interface adapted to receive respective user activity events involved in affinity scoring, according to an example described herein.

FIG. 7 is a screenshot that illustrates user interface functionality in a product listing, in a user interface adapted to receive respective user activity events involved in affinity scoring, according to an example described herein. Specifically, the user interface layout 700 is adapted to present and receive information and selection options for a particular product or service in a webpage-based user interface, and receive commerce events as a result of sequential commerce interaction activities. As shown in FIG. 7, the user interface layout 700 provides a product display page interface with a number of information display fields, specifically depicting information 714 for a particular product 712 (as shown, a specific brand and model of an appliance).

The display of the information 714 is accompanied by images 720, and displays of information for related services 722, product features 724, customer reviews 726, and accessories 728. These displays may be interactive, user controlled, or fixed. Specific user interface actions such as an "Add to Cart" 716 option, a "Save For Later" 718 option, or the like, are also presented for user interaction. Such user interaction may contribute to the user activity events which are monitored as part of affinity scoring. For instance, selecting or interacting with the displayed information, product links, or invoking a purchase option such as "Add to Cart" 716 generates events that may contribute to an affinity score of the particular product, or a category or brand associated with the particular product.

The information that is presented in the product description page may include other types of basic or detailed information, including text and graphical information in a variety of forms for the product or related products and services. The information may also be accompanied, for example, by suggested related products 730 which include multiple product advertisements 732A, 732B, product information 734A, 734B, and interaction options (e.g., a link 736 to view other recommended products). The suggested related products 730 or other types of advertisements, selections, or dynamic content may be populated, selected, refined, or updated as a result of the affinity score, in a similar manner as discussed above with reference to FIG. 6.

It will be understood that the user interface layouts 600,700 are provided as illustrative examples, and many other user interface designs relating to products, services, categories, and groupings of such products or services, and the like may be provided within a user interface. Accordingly, the type and presentation format of category and product results, information, and results of affinity scoring from interaction of such category and product results, may be based on streaming events received among a variety of user interface layouts or screens.

Figure 8:
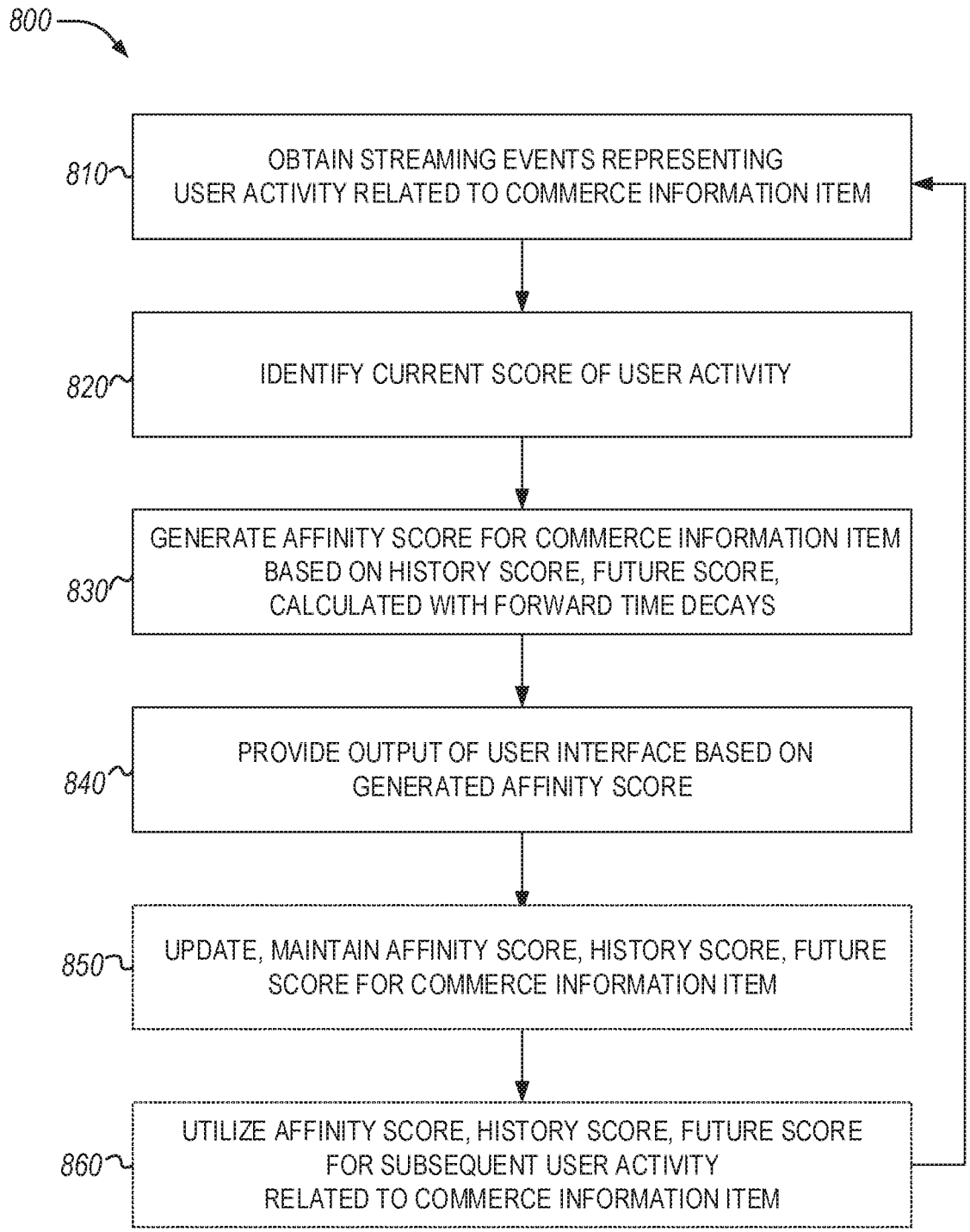
FIG. 8 illustrates a flowchart of a method for implementing affinity scoring and tracking based on streaming events, according to an example described herein.

FIG. 8 illustrates a flowchart 800 of an example method for affinity scoring processing based on streaming events according to an example described herein. It will be understood that the operations of the flowchart 800 may be implemented in connection with a computer-implemented method, instructions on a computer readable medium, or on a configuration of a computing device (or among multiple of such methods, products, or computing devices). In an example, the electronic operations are performed by a computing system that operates as a server to host and generate features of a client-accessible user interface (e.g., from a web server); in another example, the electronic operations are performed within aspects of distributed or client computing devices used to present the user interface.

As shown, the operations of the flowchart 800 may commence to include obtaining streaming events that represent user activity in a user interface relating to a commerce information item (operation 810). For instance, this user activity may be provided in connection with a user interface information listing, such as: a product details listing for a particular product; a service details listing for a particular product; a category listing of one or more products or services for a particular category; or a search listing of one or more products or services for a particular search query. Other variations involving brands, stock keeping units (SKUs), product identifiers, groupings, or even individually identified items or types of items are also possible.

The operations of the flowchart continue to identify the current score of user activity, from the streaming events (operation 820). In an example, the current score of the user activity is based on one or more activity weights associated with the particular type or characteristics of the user activity (e.g., to provide a greater weight or value for a valuable action such as add to cart). Other types of streaming event filtering, weighting, or evaluation may also occur.

The operations of the flowchart 800 continue to generate an affinity score for the commerce information item (operation 830), such as based on a history score and future score that are produced (calculated and updated) with forward time decay techniques. For instance, the history score and the future score may be calculated with forward time decays applied to a stored history score and a stored future score applied to the current score of the user activity. In a further example, the history score is calculated to increase based on cumulative prior user activity in the user interface, and decay over time, to measure a projected current interest of the user in the commerce information item based on other users' scores. Also in an example, the future score is calculated to increase based on cumulative prior user activity in the user interface, and decay over time and decrease if a transaction involving the commerce information item is complete, to measure to a projected future interest of the user in the commerce information item based on prior user activity in the user interface.

In further examples, the affinity score is uniquely associated with the user of the user interface, and respective affinity scores are maintained for respective users of the user interface. The affinity score may represent one or more of: a product group affinity score corresponding to a rating of a user commerce action with a particular group corresponding to the commerce information item; a product affinity score corresponding to a rating of a user commerce action with a particular product corresponding to the commerce information item; or an offer affinity score corresponding to a rating of a user commerce action with a particular offer corresponding to the commerce information item.

The operations of the flowchart 800 also continue to provide output of the user interface, based on the affinity score for the commerce information item (operation 840). In an example, the output in the user interface, provided based on the affinity score, includes one or more of: changed user interface functionality related to selection or viewing of the commerce information item; changed user interface filtering of product or service information related to the commerce information item; changed search results related to the commerce information item; a display of a reminder related to the commerce information item; or a display of a personalized recommendation related to the commerce information item. Also in further examples, the output of the user interface is further based on a profile corresponding to the user, such as with use of a profile corresponding to the user that includes values maintained for the stored history score and the stored future score.

The operations of the flowchart 800 conclude with the updating and maintenance of the affinity score, and any constituent scores (the history score, future score) for the commerce information item (operation 850), and the utilization of this affinity score, history score, or future score in connection with subsequent user activity (operation 860). The operations 810-850 may thus be repeated for later activities, repeat activities, or subsequent activities.

The example operations of flowchart 800 may be performed at or among concerted functions of a client or server computing device. In an example, the software application is adapted to execute on the server computing device with use of a processor and a memory device. In another example, the presentation functions of the software application are adapted to execute in an app or browser of a client computing device, such as through a communication session provided via a web server or a software application interface. The example operations of flowchart 800 may be performed through a system comprising a selection engine and an electronic user interface system, which is configured to identify and select data on behalf of an electronic commerce processing system. Other combinations and subsystems may be implemented with the operations of flowchart 800, such as illustrated with the following components in FIG. 9.

Figure 9:
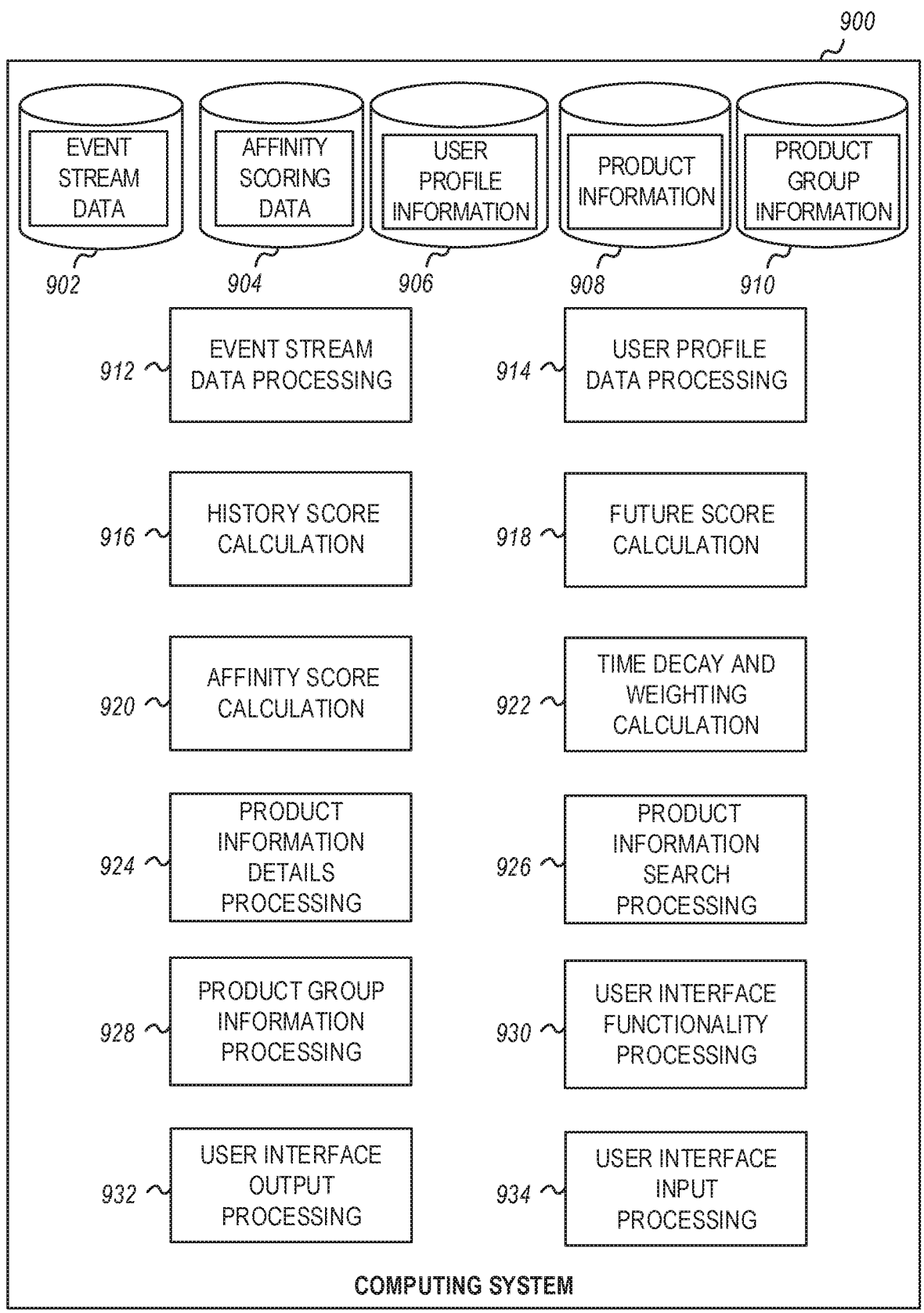
FIG. 9 illustrates a block diagram of processing and functionality components operable in a computing system implementing affinity scoring and tracking based on streaming events, according to an example described herein.

FIG. 9 illustrates a block diagram of processing and functionality components operable in a computing system 900 implementing affinity scoring and tracking based on streaming events, such as are accomplished with the examples described above. It will be understood, that although certain hardware and functional components are depicted in FIG. 9 and in other drawings as separate subsystems or services, the features of the subsystems or services may be integrated into a single system or service (e.g., in an application programming interface hosted by a server computing system). Further, although only one computing system is depicted, it will be understood that the features of these systems may be distributed among one or multiple computing systems (including in cloud-based processing settings).

As shown, the computing system 900 includes various functionality subsystems 912-934 used to perform and apply affinity scoring for user interface events and data stores 902-910 to store information to facilitate event processing, scoring, and information retrieval in connection with the affinity scoring techniques discussed herein (e.g., discussed above for FIGS. 1-8). In an example, the computing system 900 is adapted to execute software applications that implement the functionality subsystems and databases, through software application processing components and functionality, such as processing and memory circuitry and the execution of software instructions.

In an example, the computing system 900 includes data stores (e.g., databases) that store event stream data 902, affinity scoring data 904, user profile information 906, product information 908, and product group information 910. These data stores may store and implement data for the various information items used as part of calculating or determining the affinity score, as well as models, rules, constraints and attributes for implementing affinity score generation and implementation processing as discussed in the examples above.

In an example, the computing system 900 is adapted to implement respective features including: event stream data processing or functionality 912 (e.g., provided by circuitry or software instructions) used to capture, obtain, and extract data from respective user activity and information item streaming events of a user interface; user profile data processing or functionality 914 (e.g., provided by circuitry or software instructions) used to identify and track user profile information including customer-specific stores, rules, constraints, as applied with affinity scoring; history score calculation processing or functionality 916 (e.g., provided by circuitry or software instructions) used to identify, generate, and update history scores as applied with affinity scoring;

future score calculation processing or functionality 918 (e.g., provided by circuitry or software instructions) used to identify, generate, and update future scores as applied with affinity scoring; affinity score calculation processing or functionality 920 (e.g., provided by circuitry or software instructions) used to identify, generate, and track numerical or quantifiable values (scores) of affinity for a commerce information item; time decay and weighting calculation processing or functionality 922 (e.g., provided by circuitry or software instructions) used to identify and implement emphasis or de-emphasis to tracked scores as part of affinity scoring; product information details processing or functionality 924 (e.g., provided by circuitry or software instructions) used to select, identify, or illustrate product information (product details) within the user interface in connection with affinity scoring; product information search processing or functionality 926 (e.g., provided by circuitry or software instructions) used to verify and adjust ranking, ordering, and grouping information of search queries in connection with affinity scoring; product group information processing or functionality 928 (e.g., provided by circuitry or software instructions) used to select, identify, or illustrate product groups information (categories, brands, or groups of products) within the user interface in connection with affinity scoring; user interface functionality processing or functionality 930 (e.g., provided by circuitry or software instructions) used to monitor, change, activate, or track user interface functionality in connection with affinity scoring; user interface output processing or functionality 932 (e.g., provided by circuitry or software instructions) used to provide outputs within the user interface in connection with affinity scoring; and user interface input processing or functionality 934 (e.g., circuitry or software instructions) used to provide and analyze inputs within the user interface in connection with affinity scoring. Other functional and processing aspects may be performed or structurally embodied by the computing system 900 to implement the techniques discussed above for FIGS. 1-8.)

Embodiments used to facilitate and perform the techniques described herein may be implemented in one or a combination of hardware, firmware, or software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
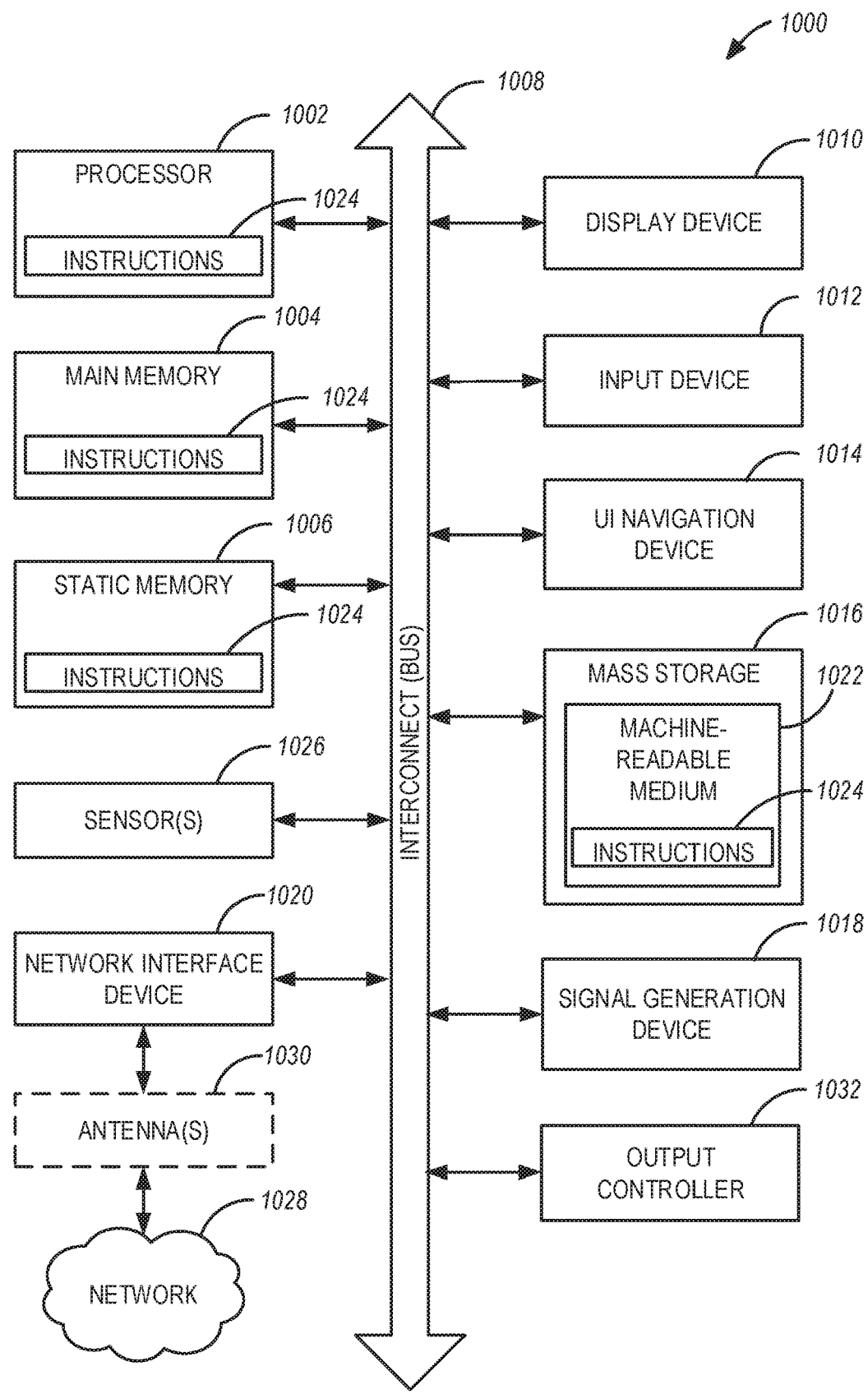
FIG. 10 illustrates a block diagram of operational components of a computing system upon which any one or more of the techniques herein discussed may be executed and implemented.

FIG. 10 illustrates a block diagram illustrating a machine in the example form of a computer system 1000, within which a set or sequence of instructions may be executed to cause the machine to perform any one of the methodologies discussed herein, according to an example. Computer system machine 1000 may be embodied by the computing system 900; the subsystem(s) implementing the data stores 902-910; the subsystem(s) implementing the various processing or functionality 912-934; the systems and engines 130, 140, 150, and interface 120; the consumer computing device 112; or any other electronic processing or computing platform described or referred to herein. Further, the computer system machine 1000 may embody instructions and data to perform any of the interfaces or functions referenced for FIGS. 1-9.

Example computer system 1000 includes at least one processor 1002. (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system 1000 may further include a video display unit 1010, an alphanumeric input device 1012 (e.g., a keyboard), and a user interface (UI) navigation device 1014 (e.g., a mouse). In one example, the video display unit 1010, input device 1012 and UI navigation device 1014 are incorporated into a touchscreen interface and touchscreen display. The computer system 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or 5G networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A computer system comprising:
   at least one processor; and
   memory coupled to the at least one processor and storing instructions that, when executed by the processor, cause the computer system to perform operations comprising:
   obtaining streaming events representing user activity performed by a user in a user interface, the user activity occurring in connection with a commerce information item, wherein the streaming events are produced from information retrieval activities or interaction activities initiated from the user in the user interface;
   generating, based on the streaming events, a current score of user activity associated with the commerce information item, the current score of the user activity to provide a measurement of user interest in the commerce information item based on the user activity;
   generating an affinity score for the commerce information item based on a calculated history score of measured user activity associated with the commerce information item and a calculated future score of projected user activity associated with the commerce information item,
      wherein the history score is calculated by combining the current score of the user activity with a previous history score corresponding to the commerce information item, wherein the current score of the user activity used to calculate the history score is increased by a first forward time decay, and wherein the increasing of the current score by the first forward time decay increases weighting of the current score relative to the previous history score without re-evaluation of data used to produce the previous history score, and
      wherein the future score is calculated by combining the current score of the user activity with a previous future score corresponding to the commerce information item, wherein the current score of the user activity used to calculate the future score is increased by a second forward time decay, and wherein the increasing of the current score by the second forward time decay increases weighting of the current score relative to the previous future score without re-evaluation of data used to produce the previous future score; and
   providing content for output in the user interface, the content being selected for output based on the generated affinity score for the commerce information item.

2. The computer system of claim 1,
   wherein the commerce information item provides one or more listing of:
   a product details listing for a particular product;
   a service details listing for a particular product;
   a brand listing of one or more products or services for a particular brand;
   a category listing of one or more products or services for a particular category; or
   a search listing of one or more products or services for a particular search query; and
   wherein the output in the user interface provides a change to an ordering, grouping, selection, or filtering of the respective listing based on the affinity score.

3. The computer system of claim 1,
   wherein the current score of the user activity is based on one or more activity weights associated with the user activity;
   wherein the affinity score is uniquely associated with the user of the user interface; and
   wherein the computing system maintains respective affinity scores for respective users of the user interface.

4. The computer system of claim 1,
   wherein the affinity score represents one or more of:
   a product group affinity score corresponding to a rating of a user commerce action with a particular product group corresponding to the commerce information item;
   a product affinity score corresponding to a rating of a user commerce action with a particular product corresponding to the commerce information item; or
   an offer affinity score corresponding to a rating of a user commerce action with a particular offer corresponding to the commerce information item.

5. The computer system of claim 1,
   wherein the output in the user interface, provided based on the affinity score, includes one or more of:
   changed user interface functionality related to selection or viewing of the commerce information item;
   changed user interface filtering of product or service information related to the commerce information item;
   changed search results related to the commerce information item;
   a display of a reminder related to the commerce information item; or
   a display of a personalized recommendation related to the commerce information item.

6. The computer system of claim 1,
   wherein the output of the user interface is further based on a profile corresponding to the user; and
   wherein the profile corresponding to the user includes values maintained for the previous history score and the previous future score.

7. The computer system of claim 1,
   wherein the history score is calculated to increase based on cumulative prior user activity in the user interface, and decay over time, to measure a projected current, interest of the user in the commerce information item based on prior user activity in the user interface.

8. The computer system of claim 7,
   wherein the future score is calculated to increase based on cumulative prior user activity in the user interface, and decay over time and decrease if a transaction involving the commerce information item is complete, wherein the future score is calculated to estimate a projected future interest of the user in the commerce information item based on the cumulative prior user activity in the user interface.

9. The computer system of claim 1, wherein the user interface is a customer interface provided to an electronic commerce service, and wherein the user interface is provided from:
   a software application operating on a client computing device, wherein the streaming events are generated from user interface navigation and interaction by the user with the software application; or a website hosted by a server computing device, wherein the streaming events are generated from user interface navigation and interaction in a web browser conducted by the user with the website.

10. A method, comprising a plurality of electronic operations executed with processor circuitry of a computing device, the plurality of electronic operations comprising:

receiving streaming events representing user activity performed by a user in a user interface, the user activity occurring in connection with a commerce information item, wherein the streaming events are produced from information retrieval activities or interaction activities initiated from the user in the user interface;

generating, based on the streaming events, a current score of user activity associated with the commerce information item, the current score of the user activity to provide a measurement of user interest in the commerce information item based on the user activity;

generating an affinity score for the commerce information item based on a calculated history score of measured user activity associated with the commerce information item and a calculated future score of projected user activity associated with the commerce information item, wherein the history score is calculated by combining the current score of the user activity with a previous history score corresponding to the commerce information item, wherein the current score of the user activity used to calculate the history score is increased by a first forward time decay, and wherein the increasing of the current score by the first forward time decay increases weighting of the current score relative to the previous history score without re-evaluation of data used to produce the previous history score, and wherein the future score is calculated by combining the current score of the user activity with a previous future score corresponding to the commerce information item, wherein the current score of the user activity used to calculate the future score is increased by a second forward time decay, and wherein the increasing of the current score by the second forward time decay increases weighting of the current score relative to the previous future score without re-evaluation of data used to produce the previous future score; and causing output of content in the user interface, the content being selected for the output in the user interface based on the generated affinity score for the commerce information item.

11. The method of claim 10, the plurality of electronic operations further comprising:

wherein the commerce information item provides one or more listing of:

a product details listing for a particular product;

a service details listing for a particular product;

a category listing of one or more products or services for a particular category;

a brand listing of one or more products or services for a particular brand; or a search listing of one or more products or services for a particular search query; and wherein providing the output in the user interface includes providing a change to an ordering, grouping, selection, or filtering of the respective listing based on the affinity score.

12. The method of claim 10, wherein the current score of the user activity is based on one or more activity weights associated with the user activity;

wherein the affinity score is uniquely associated with the user of the user interface; and wherein respective affinity scores are maintained for respective users of the user interface.

13. The method of claim 10, wherein the affinity score represents one or more of:

a product group affinity score corresponding to a rating of a user commerce action particular product group corresponding to the commerce information item;

a product affinity score corresponding to a rating of a user commerce action with a particular product corresponding to the commerce information item; or an offer affinity score corresponding to a rating of a user commerce action with a particular offer corresponding to the commerce information item.

14. The method of claim 10, wherein the output in the user interface, provided based the affinity score, includes one or more of:

changed user interface functionality related to selection or viewing of the commerce information item;

changed user interface filtering of product service information related to the commerce information item;

changed search results related to the commerce information item;

a display of a reminder related to the commerce information item; or a display of a personalized recommendation related to the commerce information item.

15. The method of claim 10, the plurality of electronic operations further comprising:

wherein the history score is calculated to increase based on cumulative prior user activity in the user interface, and decay over time, to measure a projected current interest of the user in the commerce information item based on prior user activity in the user interface; and wherein the future score is calculated to increase based on cumulative prior user activity in the user interface, and decay over time and decrease if a transaction involving the commerce information item is complete, wherein the future score is calculated to estimate a projected future interest of the user in the commerce information item based on the cumulative prior user activity in the user interface.

16. The method of claim 10, wherein the user interface is a customer interface provided to an electronic commerce service, and wherein the user interface is provided from:

a software application operating on a client computing device, wherein the streaming events are generated from user interface navigation and interaction by the user with the software application; or a website hosted by a server computing device, wherein the streaming events are generated from user interface navigation and interaction in a web browser conducted by the user with the website.

17. A non-transitory computer-readable storage medium, the computer-readable storage medium including instructions that, when executed by processor circuitry of a computing device, causes the processor circuitry to perform operations comprising:

receiving streaming events representing user activity performed by a user in a user interface, the user activity occurring in connection with a commerce information item, wherein the streaming events are produced from information retrieval activities or interaction activities initiated from the user in the user interface;

generating, based on the streaming events, a current score of user activity associated with the commerce information item, the current score of the user activity to provide a measurement of user interest in the commerce information item based on the user activity;

generating an affinity score for the commerce information item based on a calculated history score of measured user activity associated with the commerce information item and a calculated future score of projected user activity associated with the commerce information item, wherein the history score is calculated by combining the current score of the user activity with a previous history score corresponding to the commerce information item, wherein the current score of the user activity used to calculate the history score is increased by a first forward time decay, and wherein the increasing of the current score by the first forward time decay increases weighting of the current score relative to the previous history score without re-evaluation of data used to produce the previous history score, and wherein the future score is calculated by combining the current score of the user activity with a previous future score corresponding to the commerce information item, wherein the current score of the user activity used to calculate the future score is increased by a second forward tune decay, and wherein the increasing of the current score by the second forward time decay increases weighting of the current score relative to the previous future score without re-evaluation of data used to produce the previous future score; and causing output of content in the user interface, the content being selected for the output in the user interface based on the generated affinity score for the commerce information item.

18. The computer-readable storage medium of claim 17, wherein the commerce information item provides one or more listing of:
a product details listing for a particular product;
a service details listing for a particular product;
a category listing of one or more products or services for a particular category;
a brand listing of one or more products or services for a particular brand; or
a search listing of one or more products or services for a particular search query; and
wherein the output in the user interface includes a change to an ordering, grouping, selection, or filtering of the respective listing based on the affinity score.

19. The computer-readable storage medium of claim 17, wherein the current score of the user activity is based on one or more activity weights associated with the user activity;
wherein the affinity score is uniquely associated with the user of the user interface; and
wherein respective affinity scores are maintained for respective users of the user interface.

20. The computer-readable storage medium of claim 17, wherein the affinity score represents one or more of:
a product group affinity score corresponding to a rating of a user commerce action with a particular product group corresponding to the commerce information item;
a product affinity score corresponding to a rating of a user commerce action with a particular product corresponding to the commerce information item; or
an offer affinity score corresponding to a rating of a user commerce action with a particular offer corresponding to the commerce information item.

21. The computer-readable storage medium of claim 17, wherein the output in the user interface, provided based on the affinity score, includes one or more of:
changed user interface functionality related to selection or viewing of the commerce information item;
changed user interface filtering of product or service information related to the commerce information item;
changed search results related to the commerce information item;
a display of a reminder related to the commerce information item; or
a display of a personalized recommendation related to the commerce information item.

22. The computer-readable storage medium of claim 17, wherein the history score is calculated to increase based on cumulative prior user activity in the user interface, and decay over time, to measure a projected current interest of the user in the commerce information item based on prior user activity in the user interface; and
wherein the future score is calculated to increase based on cumulative prior user activity the user interface, and decay over time and decrease if a transaction involving the commerce information item is complete, wherein the future score is calculated to estimate a projected future interest of the user in the commerce information item based on the cumulative prior user activity in the user interface.

23. The computer-readable storage medium of claim 17, wherein the user interface is a customer interface provided to an electronic commerce service, and wherein the user interface is provided from:
a software application operating on a client computing device, wherein the streaming events are generated from user interface navigation and interaction by the user with the software application; or
a website hosted by a server computing device, wherein the streaming events are generated from user interface navigation and interaction in a web browser conducted by the user with the website.

* * * * *